United States Patent [19]
Tanigaki

[11] 3,881,145
[45] Apr. 29, 1975

[54] PULSE GENERATING DEVICE FOR RADAR TRANSMITTING SYSTEM
[75] Inventor: Hidetoshi Tanigaki, Nagasaki, Japan
[73] Assignee: Kiyotaka Furano, Nagasaki, Japan
[22] Filed: Apr. 15, 1974
[21] Appl. No.: 461,049

[30] Foreign Application Priority Data
Apr. 13, 1973 Japan................................ 48-44948

[52] U.S. Cl. ...................... 320/1; 307/108; 307/110
[51] Int. Cl. .. H03k 17/06; H03k 17/08; H03k 3/82
[58] Field of Search ................. 320/1; 307/108, 110

[56] References Cited
UNITED STATES PATENTS
3,259,829  7/1966  Feth ........................................ 320/1
3,389,322  6/1968  Smeltzer ................................ 320/1

Primary Examiner—Stuart N. Hecker
Attorney, Agent, or Firm—Sughrue, Rothwell, Mion, Zinn & Macpeak

[57] ABSTRACT

In a radar transmitting system including a charge and discharge circuit and a pulse generating circuit which is initiated by discharging of the charge and discharging circuit, a semiconductor switching device such as, for example, a thyristor is employed to discharge the charge and discharge circuit. An inductive element is provided between the charge and discharge circuit and the semiconductor switching device so that the discharging of the charge and discharge circuit may be delayed until the semiconductor switching device is turned on completely.

1 Claim, 3 Drawing Figures

PULSE GENERATING DEVICE FOR RADAR TRANSMITTING SYSTEM

The present invention is in general directed to a radar transmitting system, and more particularly to an arrangement for protecting a pulse generating device in a radar transmitting system which generates radar pulses in microwaves.

As is well known, two types of pulse generating devices are in common use: the line pulser and the hard-tube, or power-amplifier, pulser. In either case, radar pulses are generated by charging and discharging capacitors, and when a semiconductor switching device such as, for example, a thyristor, is utilized to charge and discharge the capacitor, there may be some possibility of break-down of the semiconductor switching device due to excess current when it is turned on. Besides, semiconductor switching devices have in general a longer turn-on time as compared with a thyratron that has been used in the prior art. Accordingly, the energy of the pulse wave may be dissipated in the semiconductor switching device during its turn-on operation, and the output power of radar pulse will be decreased by the amount of the dissipated loss. Furthermore, the shorter the pulse width of the radar pulse becomes, the more the output power is decreased.

It is, therefore, an important object of the present invention to provide a pulse generating device which may operate at high efficiency without decrease in the output power of the radar pulse and without break-down of the semiconductor switching device.

The novel features which are considered as characteristic of the present invention are set forth in particular in the appended claim. The improved pulse generating device for radar transmitting system itself, however, both as to its construction and its mode of operation, together with additional features and advantages thereof, will be best understood upon perusal of the following detailed description of a specific embodiment with reference to the accompanying drawings in which;

BRIEF DESCRIPTION OF THE DRAWINGS

Referring now to FIG. 1, a radar transmitting system includes a pulse generating circuit 1 utilizing, for example, a magnetron which generates radar pulses to be transmitted through an aerial 2. Operation of the pulse generating circuit 1 is effected by a charge and discharge circuit 3 and is initiated when the charge in the charge and discharge circuit 3 is discharged through thyristor S1.

The charge and discharge circuit 3 comprises an inductance L and capacitors C and is supplied charging current from a power supply 4 through a charging thyristor S2 which will become conducting when it is triggered by a triggering pulse from trigger-pulse generator circuit 5. After the charge and discharge circuit 3 finishes charging, a triggering pulse is applied to the discharging thyristor S1 from the trigger-pulse generator circuit 5 so as to discharge the charge and discharge circuit 3.

Figure 1:
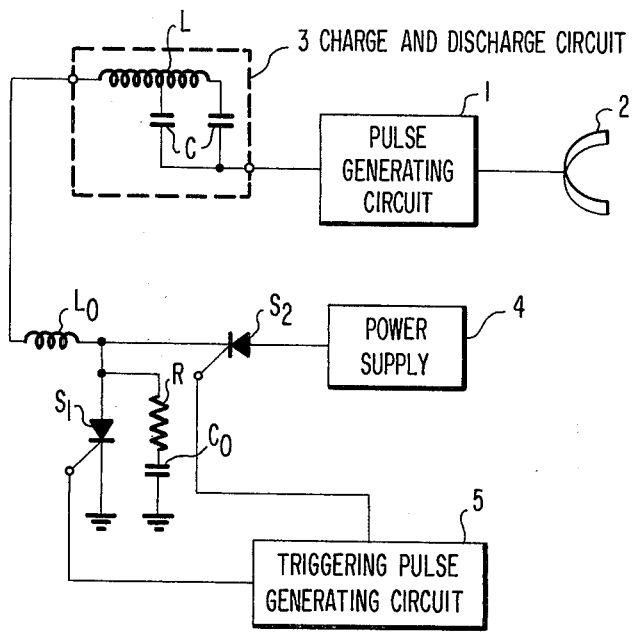
FIG. 1 is a block diagram of a preferred embodiment of the present invention.
Figure 2:
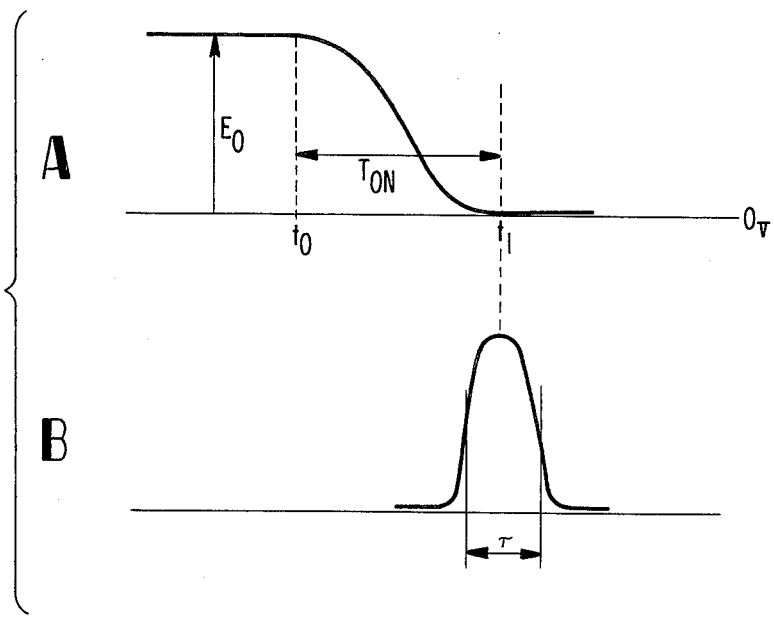
FIG. 2A shows anode voltage versus time.
FIG. 2B shows the change of the charge in the charge and discharge circuit.

After the thyristor S1 is first turned on, a certain duration of time may be needed for it to turn on, completely even though this time is very short. FIG. 2A illustrates the change of anode voltage of the thyristor S1 in which a triggering pulse is applied at time $t0$, the anode voltage $Eo$ of the non-conducting state is gradually decreasing, and the thyristor S1 is completely turned on at time $t1$. Therefore, if the charge and discharge circuit 3 is discharged abruptly at the same time when the thyristor S1 is first triggered to turn on, the thyristor S1 may possibly be broken down.

In order to overcome this problem, in accordance with the present invention, there is provided a very small inductance $Lo$ between the thyristor S1 and the charge and discharge circuit 3. The small inductance $Lo$ has the function of temporarily blocking the flow of excess current. In addition to providing the small inductance $Lo$, according to the present invention, a capacitor $Co$ is connected in parallel to the thyristor S1 so that the turn-on operation of the thyristor S1 can be made smoothly by discharging the charge in the capacitor $Co$ therethrough, in the manner described hereinafter: That is, when the thyristor S2 becomes conducting, the charge and discharge circuit 3 is charged, and at the same time the capacitor $Co$ is also charged. Upon applying a triggering pulse to the thyristor S1, the charge in the capacitor $Co$ starts to discharge through the thyristor S1, which will turn on according to the process shown in FIG. 2A. At this time the charge in the charge and discharge circuit 3 may not flow through the thyristor S1 due to the blocking action of the small inductance $Lo$. Accordingly, when the value of the inductance $Lo$ is determined so that initiation of discharging of the charge and discharge circuit 3 may be delayed by the turn-on time $T_{ON}$ of the thyristor S1, the charge and discharge circuit 3 will start to discharge just after the thyristor is completely turned on as shown in FIG. 2B. The width of the pulse shown in FIG. 2B is determined by the time constant of the charge and discharge circuit 3. A resistor R, which is connected in series with the capacitor $Co$, is provided to prevent the charge in the capacitor $Co$ from discharging instantly.

The loss dissipated in the thyristor S1 may be determined by the product of current flowing therethrough and voltage between the anode and cathode thereof. In the case in which the pulse is initiated after the thyristor S1 has completely turned on, since the voltage between anode and cathode is zero, there will be no loss. All energy of the pulse wave will, therefore, be supplied to the pulse generating circuit 1 so as to send out a radar pulse of maximum output power from the aerial 2. The result of an experiment has proved that with 0.05 microsecond pulse width of the radar pulse, an output pulse of 15.8 KW was obtained with the circuit according to this invention, while an output pulse of 11.3 KW was obtained when the charge and discharge circuit 3 was discharged without the delay provided by the small inductance, which means that output power of the pulse wave may be increased approximately by 40 percent with the arrangement in accordance with the present invention.

From the foregoing, it is apparent that the present invention provides a radar transmitting system having high power output and high efficiency without break-down of the semiconductor switching device, and accordingly, the radar system can be reduced in size and weight and be excellent in durability by employing semiconductor devices.

Although the present invention has been described with respect to a certain specific embodiment, it will be appreciated that modifications and changes may be made by those skilled in the art without departing from the true spirit and scope of the invention.

What is claimed and desired to be secured by Letter Patent of the United States is:

1. A pulse generating device for a radar transmitting system comprising:

a charge and discharge circuit including at least a capacitor, a pulse generating circuit which is initiated by discharging of said charge and discharge circuit so as to generate microwave pulses, a semiconductor switching device which may become conducting after the charge and discharge circuit is charged so as to permit the charge and discharge circuit to discharge, an inductance connected between said charge and discharge circuit and said semiconductor switching device to delay the discharge current from the charge and discharge circuit, and a capacitor connected in parallel to the semiconductor switching device, and which is charged by a portion of the charging current for the charge and discharge circuit and is discharged when the semiconductor switching device is turned on.

* * * * *